United States Patent
Florit et al.

(10) Patent No.: US 8,411,690 B2
(45) Date of Patent: Apr. 2, 2013

(54) PREVENTING DATA TRAFFIC CONNECTIVITY BETWEEN ENDPOINTS OF A NETWORK SEGMENT

(75) Inventors: Lionel Florit, Greenbrae, CA (US); Robert W. Klessig, Los Altos Hills, CA (US); Francois E. Tallet, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 865 days.

(21) Appl. No.: 11/711,294

(22) Filed: Feb. 27, 2007

(65) Prior Publication Data

US 2008/0205302 A1  Aug. 28, 2008

(51) Int. Cl.
*H04L 12/28* (2006.01)
*H04L 1/22* (2006.01)
(52) U.S. Cl. ......... 370/401; 370/218; 370/242; 370/255
(58) Field of Classification Search .................. None
See application file for complete search history.

(56) References Cited

U.S. PATENT DOCUMENTS

| | | | | |
|---|---|---|---|---|
| 6,717,922 B2 | 4/2004 | Hsu et al. | | 370/258 |
| 2002/0181413 A1* | 12/2002 | Kitagawa | | 370/256 |
| 2002/0196795 A1* | 12/2002 | Higashiyama | | 370/401 |
| 2006/0206656 A1* | 9/2006 | Di Benedetto et al. | | 710/316 |
| 2006/0250969 A1* | 11/2006 | Florit et al. | | 370/241 |
| 2007/0025275 A1* | 2/2007 | Tallet et al. | | 370/255 |
| 2007/0047471 A1 | 3/2007 | Florit et al. | | |
| 2007/0047472 A1 | 3/2007 | Florit et al. | | |
| 2007/0258359 A1* | 11/2007 | Ogasawara et al. | | 370/218 |
| 2008/0025203 A1* | 1/2008 | Tallet | | 370/216 |
| 2008/0031154 A1* | 2/2008 | Niazi et al. | | 370/254 |

OTHER PUBLICATIONS

Extreme Networks, Ethernet Automatic Protection Switching Evaluation Report, published by BTexact, © British Telecommunications, plc, 2003, pp. 1-23.

* cited by examiner

*Primary Examiner* — Marsha D. Banks Harold
*Assistant Examiner* — Matthew Campbell
(74) *Attorney, Agent, or Firm* — Campbell Stephenson LLP

(57) ABSTRACT

Various systems and method of preventing data traffic connectivity between endpoints of a network segment are disclosed. One method involves receiving a segment protocol message from a first segment port within a network segment, which includes a plurality of network devices. In response to receipt of the segment protocol message, which can indicate whether connectivity is present between the segment endpoints via the network segment, a second segment port can be operated in a blocked state. Operating the second segment port in the blocked state prevents data plane connectivity via the network segment.

27 Claims, 9 Drawing Sheets

PREVENTING DATA TRAFFIC CONNECTIVITY BETWEEN ENDPOINTS OF A NETWORK SEGMENT

FIELD OF THE INVENTION

This invention relates generally to networking and, more particularly, to preventing data loops within a network segment.

DESCRIPTION OF THE RELATED ART

There are many different topologies that can be used to couple network devices. Many network configurations present the opportunity for data forwarding loops to arise. For example, a ring network itself forms a loop. A mesh network is likely to contain many loops. Additional loops may arise when several sub-networks are connected.

In order to prevent forwarding loops, networks often implement loop prevention protocols, such as spanning tree protocol (STP), that are configured to detect whether a loop is present and, if so, to block traffic at one point in the loop. Under normal operating circumstances, this configuration allows messages to be forwarded normally and avoids the undesirable behavior that might arise if a forwarding loop was present within the network.

If a break occurs within a network, communication may be disrupted. The loop prevention protocol can end the disruption by ceasing to block traffic at a previously-blocked port. This allows messages to continue to be forwarded via the network, despite the break. The break itself can act to prevent forwarding loops in this scenario. The amount of time needed to recover from a break in a network is referred to as convergence time.

Many current loop prevention protocols can be complicated for a user to configure. Additionally, most loop prevention protocols operate over an entire network, which increases both configuration difficulty and convergence time. Accordingly, loop prevention protocols that provide improved ease of use as well as improved convergence time are desirable.

BRIEF DESCRIPTION OF THE DRAWINGS

A more complete understanding of the present invention may be acquired by referring to the following description and the accompanying drawings, in which like reference numbers indicate like features.

Figure 1:
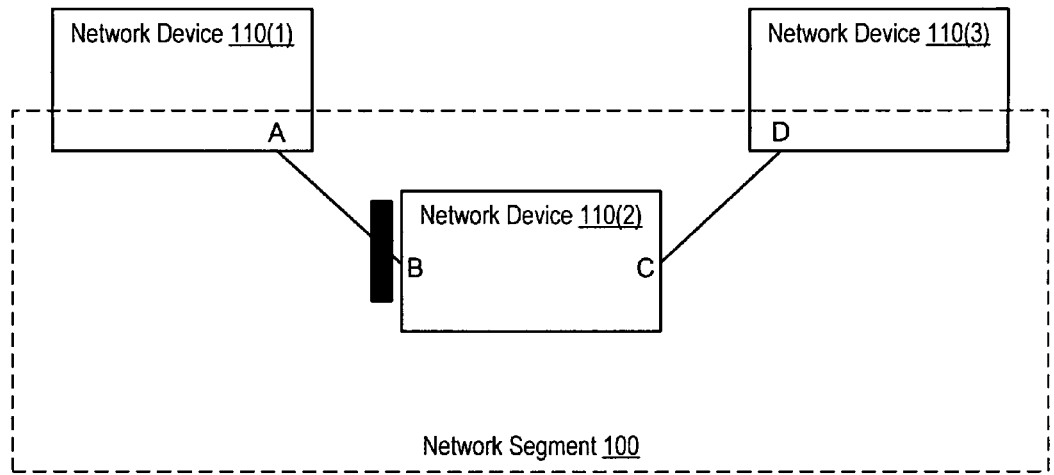
FIG. 1 shows an example of a network segment that is controlled by a segment protocol, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION OF EXAMPLE EMBODIMENTS

Overview

Various systems and method of preventing data traffic connectivity between endpoints of a network segment are disclosed. One method involves receiving a segment protocol message from a first segment port within a network segment, which includes a plurality of network devices. In response to receipt of the segment protocol message, which can indicate whether connectivity is present between the segment endpoints via the network segment, a second segment port can be operated in a blocked state. Operating the second segment port in the blocked state prevents data plane connectivity via the network segment.

Description of the Figures

FIG. 1 shows an example of a network segment 100 that includes ports within three network devices 110(1), 110(2), and 110(3). Each network device is coupled to one or more other network devices within network segment 100 by a network link. Each network link can provide bidirectional communication between a pair of network devices. A link can be a physical link (e.g., a coaxial cable, one or more optical fibers, a wireless link, or the like) or a logical link (e.g., a network tunnel, another network segment, or the like).

Figure 2:
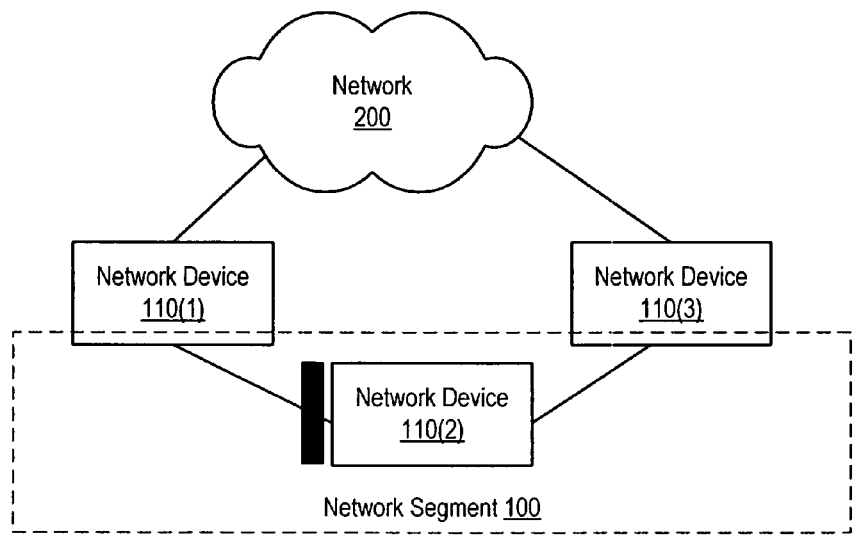
FIG. 2 is a block diagram of illustrating how a network segment that implements the segment-based loop prevention protocol can be coupled to another network, according to one embodiment of the present invention.

Network devices 110(1)-110(3) are network devices such as switches, routers, bridges, and the like that perform operations such as switching, routing, and/or bridging of messages. In one embodiment, network devices 110(1)-110(3) act as part of an access network that provides customers and/or end-users with access to a larger network (e.g., an Open Standards Interconnection (OSI) layer 2 or layer 3 network), as shown in FIG. 2. In such a situation, one or more of network devices 110(1)-110(2) can be coupled to customer devices (e.g., routers and/or switches) and/or end-user devices such as hosts. Additionally, network devices 110(1)-110(3) can be coupled to network equipment that interconnects one or more access networks with a larger network.

A network segment is a linear, daisy-chain arrangement of network devices, such that traffic can be conveyed from one point in the segment to another via the segment using, at most, exactly one path within the network segment and such that each network device within the segment is involved in conveying a message sent from one endpoint of the segment to another. In a network segment, each network device within the segment is coupled to, at most, two other network devices within the segment.

Within each of network devices 110(1)-110(3), up to two ports can be configured as segment ports within network segment 100 (other ports within those network devices can be configured as segment ports of other network segments or as non-segment ports). A port can be configured as segment port by setting a register associated with the port to a particular value (e.g., a value that uniquely identifies the segment in which that port will participate). In the example of FIG. 1, network device 110(1) includes one segment port (which is coupled to network device 110(2)), network device 110(2) includes two segment ports (which are coupled to network device 110(1) and network device 110(3) respectively), and network device 110(3) includes one segment port 110(3) (which is coupled to network device 110(2)).

In some embodiments, when a port is configured as a segment port, that port's blocking state (i.e., whether the port is blocking data traffic) will be controlled by a segment protocol instead of by any other loop prevention protocol (e.g., Spanning Tree Protocol (STP)). In other words, in such embodiments, the blocking state of a given port can be controlled by either the segment protocol or another loop prevention protocol but not both. In such an embodiment, when a port is configured as a segment port, that port can be configured to drop any loop prevention protocol messages that are not segment protocol messages. Segment protocol messages are implemented such that the segment protocol messages will not trigger control processing when received by non-segment ports (in some situations, as described below, certain types of segment protocol messages may not even trigger control processing when received by segment ports). In other words, segment protocol messages can be treated as regular data traffic (as opposed to control traffic) by non-segment ports. A segment protocol message sent to one of network devices 110(1)-110(3) is detected by the receiving segment port and processed by the receiving network device.

The segment protocol is a protocol that prevents data plane connectivity between endpoints of the network segment when the network segment is fully operational. Due to the operation of the segment protocol within network segment 100, there will be no data plane connectivity between both endpoints via network segment 100. In other words, the segment protocol is a segment-based loop prevention protocol that is designed to prevent loops caused by including a network segment within a larger networking environment. The endpoints of the network segment are the segment ports at each end of the network segment. In FIG. 1, one endpoint is within network device 110(1) and the other is within network device 110(3). In other embodiments, two different ports within the same network device can be configured as segment endpoints, such that both segment endpoints are within the same network device. As shown in FIG. 1, the segment protocol has blocked connectivity within network segment 100 by blocking the port within network device 110(2) that is coupled to network device 110(1), as represented by the solid black bar in FIG. 1. The segment protocol can be implemented using Resilient Ethernet Protocol (REP), available from Cisco Systems, Inc. of San Jose, Calif.

Blocking a port involves operating that port in a blocked state. A port that is in a blocked state can still receive and send messages; however, that port will not forward data traffic to any other port (instead, such traffic will be "dropped" by deleting or otherwise failing to forward or resend that traffic). Similarly, a port that is in a blocked state (i.e., a blocked port) will drop all incoming data traffic received by that port. Accordingly, any data messages that are being sent via a blocked port will be dropped. In the example of FIG. 1, for example, data traffic being sent from network device 110(3) to network device 110(1) via network segment 100 will be dropped by the blocked port in network device 110(2). Accordingly, network devices 110(1) and 110(3) will need to use another path that is outside of network segment 100 to communicate data messages with each other. While a blocked port will not forward data messages, control messages may still be forwarded and received by a blocked port.

Data messages are messages that are being sent in the data plane. Such messages are forwarded normally and typically do not require control plane processing to be forwarded (although data messages may trigger control plane processing, the data messages can be forwarded independently of whether the control plane processing is complete). In contrast, most (but not all, as will be discussed in more detail below) control messages (e.g., certain segment protocol messages used to implement the segment protocol) are sent in the control plane and require control plane processing before being forwarded or regenerated.

The receiving network device can differentiate between control and data messages based upon information in the header of each message. For example, control messages can be sent to specific destination addresses that are not used for data traffic. In response to receiving a control message (e.g., as identified by the destination address of the segment protocol message), the receiving port can generate an interrupt that causes a protocol module within the network device to handle the control message. For example, a segment protocol module can be used to handle segment protocol messages.

In response to processing a segment protocol message, the segment protocol module can generate another segment protocol message. The new segment protocol message may simply be a copy of the received segment protocol message. The segment protocol module can then send the new segment protocol message from either the receiving segment port (e.g., if the generated segment protocol message contains a response to the received segment protocol message) or from the other segment port (e.g., if the segment protocol message is being sent towards the other end of the network segment).

The network segment is fully operational when there are no failures within the segment. A segment failure can include the unidirectional or bidirectional failure of a link that couples two segment ports, the failure of a segment port, and/or the failure of a network device that includes one or more segment ports. In general, a segment failure can be any failure that disrupts communication via the network segment.

Each network device that includes an endpoint of a network segment controlled by the segment protocol is designed to be coupled to another network component. This other network component, which can include an individual network device, a bridged domain, a network, another network segment, and the like, can also be coupled to other network components. The interconnection of one or more other components to ends of a network segment can provide another path, which includes devices that are not part of the network segment, for traffic to be communicated between network devices within the network segment.

The use of the segment protocol allows a network segment to be connected to other network components without causing data loops. For example, in FIG. 2, the endpoints of network segment 100 (which are ports within network devices 110(1) and 110(3) respectively) are coupled to network 200. Network 200 can provide a path for network devices 110(1) and 110(3) to communicate, while the blocked port in network device 110(2) prevents a data loop from forming due to the attachment of network segment 100 to network 200.

Under normal operating circumstances, a network segment is configured to be connected to other network components in such a way that no subsection of the network segment is bypassed by the other network components. Thus, while the network devices that contain endpoints of a network segment can be coupled, as shown in FIG. 2, network devices that contain non-endpoint segment ports are not (under normal operating circumstances) coupled by other network components, since doing so might introduce a data loop.

If a failure occurs within the network segment, the segment protocol will detect the failure and cause the blocked port to unblock. If the failure is repaired, the segment protocol can again detect that the network segment is fully operational and, in response, block one of the segment ports within the network segment. In one embodiment, segment size (e.g., the number of ports and/or network devices included within a segment) is limited such that the segment's convergence time after a failure is 100 ms or less.

In addition to unblocking the blocked port in response to detection of a failure within the segment, the segment protocol will also cause all network devices within the segment to flush (i.e., by removing one or more entries) their forwarding tables, since the combination of the failure and the unblocking of the previously-blocked port may cause the routes used to convey messages to particular destination addresses to change. Accordingly, in response to receiving a segment protocol message (referred to herein as a "topology change" message) indicating that a failure has occurred within the network segment, a network device will remove any forwarding information that identifies the receiving segment port as a forwarding destination.

The segment protocol does not react to any activity outside of the network segment itself. In other words, regardless of whether the network devices that include the segment endpoints have connectivity via other network component(s), the segment protocol will block a port within the segment if connectivity exists via the network segment.

By only reacting to local connectivity (i.e., connectivity within the network segment itself), the segment protocol provides a local solution to the loop prevention problem. As noted above, reacting to only local events can improve convergence time after a failure within the network segment. Additionally, by only responding to local connectivity events, the segment protocol can prevent undesirable network effects from taking place. For example, a network segment can be used as an access network that is coupled to a core network. The amount of traffic handled by the core network may greatly exceed the bandwidth of the access network, and thus it would be highly undesirable to reroute core traffic through the access network in response to a failure in the core network. Since the segment protocol will not unblock a blocked segment port within the access network due to a failure within the core network (since the core network is not part of the network segment controlled by the segment protocol), this segment protocol prevents this scenario from occurring.

Configuration of the segment protocol can be relatively simple, involving configuring each segment port and installing software to implement the segment protocol on each network device that is to be part of the network segment. Additionally, the segment protocol prevents data loops that might otherwise arise due to the addition of a network segment to an existing network. Thus, because data loops are prevented by the segment protocol, there is no need to configure more complicated loop prevention protocols on the network devices within the network segment (unless such network devices are also participating in non-segment networks). This can improve the ease with which network administrators can expand their networks.

As noted above, the segment protocol operates to detect connectivity within the network segment. If the segment is fully operational, the segment protocol operates to block one of the segment ports. The blocked segment port can be an endpoint or a non-endpoint segment port.

The segment protocol can detect connectivity in a variety of different ways. In general, connectivity within the network segment can be detected by exchanging segment protocol messages between segment ports within the network segment. For example, each pair of adjacent segment ports within the network segment can exchange segment protocol messages at predetermined intervals and/or in response to predetermined stimuli. These protocol messages can be sent as control messages, meaning that the protocol messages will not be blocked by the blocked port within the segment (since these particular segment protocol messages are control messages that are not handled as data traffic).

In one embodiment, each adjacent pair of segment ports exchange a set of three messages with each other in order to determine whether bidirectional connectivity exists. For example, in FIG. 1, the endpoint segment port in network device 110(1) can exchange segment protocol messages with the blocked segment port in network device 110(2). The first message can be sent by the endpoint segment port and can contain information identifying the sending segment port (e.g., the content of the first segment protocol message is equivalent to the endpoint announcing "I'm port A"). The blocked segment port within network device 110(2) receives this message and performs the appropriate control plane processing, which generates the second segment protocol message in the exchange. Receipt of the first segment protocol message informs the receiving segment port that unidirectional connectivity exists from the endpoint segment port to the blocked segment port.

The second segment protocol message identifies both the sender of the first segment protocol message (the endpoint segment port within network device 110(1)) and the segment port that is sending the second segment protocol message (the blocked segment port within network device 110(2)) (e.g., the content of the second segment protocol message is equivalent to the blocked segment port announcing "I'm port B, and I just received a message from port A"). In response to receiving this second message, the receiving segment port (the endpoint segment port within network device 110(1)) can perform control plane processing based upon the second message to generate the third segment protocol message in the exchange. Receipt of the second segment protocol message informs the receiving segment port that bidirectional connectivity exists between the endpoint segment port and the blocked segment port.

The third segment protocol message identifies the sender (e.g., the blocked segment port) of the second segment protocol message and the sender (e.g., the endpoint segment port) of the third segment protocol message (e.g., the content of the third segment protocol message is equivalent to the endpoint segment port announcing "I'm port A, and I just received a message from port B"). Receipt of the third segment protocol message informs the receiving segment port that bidirectional connectivity exists between the blocked segment port and the endpoint segment port.

If a given pair of adjacent segment ports fail in their attempt to exchange segment protocol messages via the network segment (e.g., because the segment ports have been incorrectly connected, a neighboring network device is experiencing a control plane failure, or the like), one or both of the segment ports will enter a failed state. A segment port in the failed state (i.e., a failed port) will block data traffic but will continue to send and receive control messages, if able.

Another technique for detecting connectivity within the network segment involves sending a special type of segment protocol message, which is referred to herein as an Edge Port Advertisement (EPA). EPAs can be used instead of and/or in addition to the set of three segment protocol messages described above when detecting connectivity within the segment. EPAs are sent by each endpoint within the network segment.

In some embodiments, endpoint segment ports identify themselves through special configuration information provided by an administrator. For example, whenever an administrator configures a port as a segment port, the administrator can also configure whether that port is an endpoint or not. Again, such configuration can be performed by setting a register to a particular value (e.g., the value can identify the network segment, if any, to which the port belongs, as well as whether the port is an endpoint).

In response to being configured as an endpoint, an endpoint segment port will routinely (e.g., at prespecified intervals and/or in response to prespecified events, such as the topology change indications generated within the network segment) send an EPA to the neighboring segment port. The EPA contains information identifying the sending endpoint segment port and is sent towards the opposite endpoint of the network segment. Each intervening segment port that receives the EPA adds its own identifier to the EPA, such that the EPA will eventually include the identifier of each segment port within the network segment (other than the identifier of the final endpoint towards which the EPA is being sent).

As an example, assume that the segment ports in network segment 100 are labeled (starting with the endpoint in network device 110(1)) A, B, C, D, as shown in FIG. 1. Segment port A can send an EPA identifying itself (segment port A) to segment port B, which can in turn generate a new version of the EPA identifying segment port A and segment port B. This new version of the EPA can be sent (internally within network device 110(2)) to segment port C, which generates a new version of the EPA identifying segment ports A, B, and C. This version of the EPA is received by the other endpoint of the segment, segment port D.

EPAs are sent from each endpoint. Each segment port can store a copy of the information contained within each EPA processed by that segment port. Based upon the EPAs received at any point in the network segment, a picture of the arrangement of the entire network segment can be constructed. For example, in the above described example, segment port C will store information identifying ports A and B (from the EPA sent from port A to port D) and information identifying port D (from the EPA sent from port D to port A). This allows segment port C to identify that the network segment contains segment ports A, B, C, and D, in that order. If any segment port later fails, the identity of that segment port can be sent to the other segment ports within the network segment, allowing the location of a failure to be exactly known.

Figure 3A:
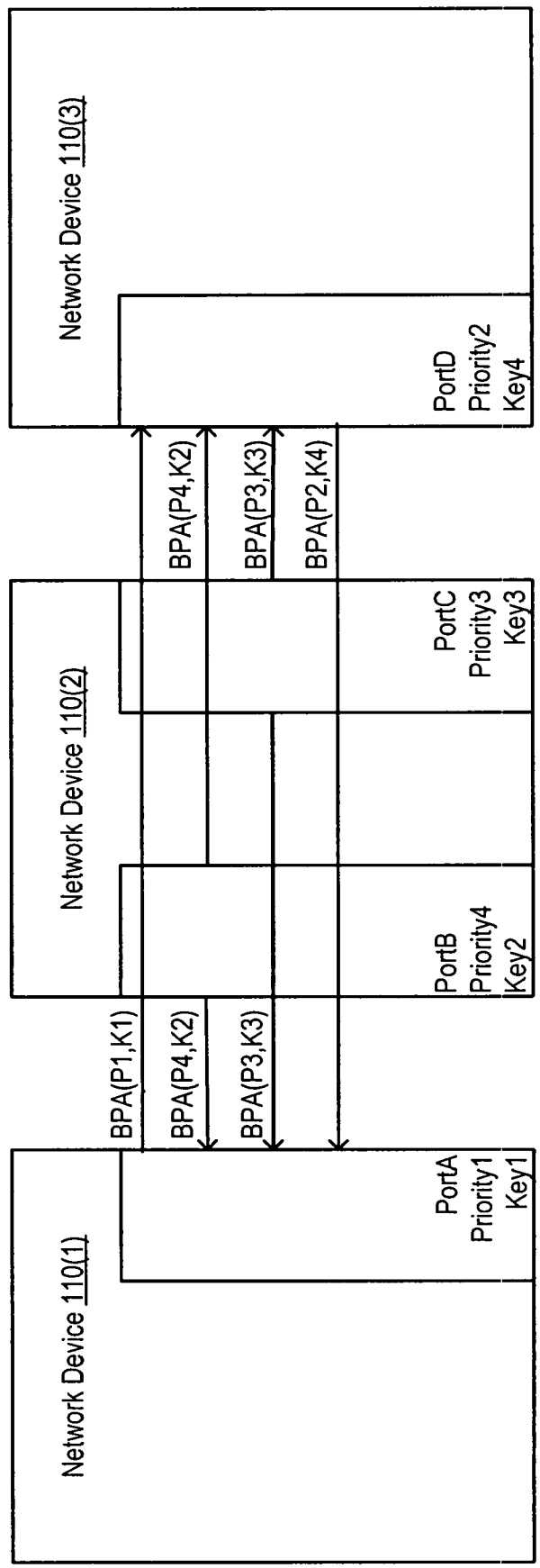
FIGS. 3A, 3B, and 3C are block diagrams of a network segment illustrating how segment protocol messages can be used to select a segment port to block during normal operation and to unblock a segment port if a failure occurs, according to one embodiment of the present invention.

FIG. 3A illustrates an example of how the segment protocol can select which segment port to block when connectivity exists within the network segment. In this embodiment, each segment port has been assigned a port identifier as well as a random number. The port identifier can be assigned by an administrator during segment configuration or can be determined from other information associated with the port. The random number can be generated when the port begins operating. Each segment port within the same network device will have its own port identifier as well as its own random number (i.e., this information is not shared by segment ports within the same network device). Each segment port also has a unique priority within the network segment. This priority can be administrator-configured or derived from existing information (such as the port identifier). In this example, higher priority ports are more likely to be elected as the blocked port, so an administrator can assign priorities in a manner that controls where the blocked port will be within the network segment during normal operation.

In this example, port A in network device 110(1) is identified as port A and has priority 1 (P1). Key 1 (K1) includes the random number generated by port A (key 1 can also include all or part of port A's identifier). Port B in network device 110(2) is identified as port B and has priority 4 and key 2. Port C in network device 110(2) has priority 3 and key 3. Port D in network device 110(3) has priority 2 and key 4.

In this embodiment, each segment port begins operation in a blocked state. In this state, segment protocol messages (which are control messages) can still be sent and received, allowing the segment ports to exchange segment protocol messages in order to detect connectivity as described above.

Additionally, the segment ports can begin exchanging messages, which are referred to as Bridge Port Advertisements (BPAs) in this example, in order to select which segment ports will unblock (and thus which segment ports will remain blocked to prevent data connectivity). If a segment port is failed, that segment port will begin operating in a blocked state, as described above.

Here, each segment port sends a BPA containing the sending segment port's key and priority, to each other segment port. As shown, each segment port sends at most two BPAs, one towards each endpoint. Thus, port A sends a single BPA, BPA(P1, K1), towards port D. Port B sends two copies of BPA(P4, K2), one towards port A and the other towards port D. Port C also sends two copies of BPA(P3, K3), one towards port A and the other towards port D. Port D sends a single BPA, BPA(P2, K4) towards port A.

When a segment port receives a BPA, that segment port will initiate control processing of the BPA. The segment port will also send a copy of the BPA towards the appropriate endpoint. For example, when port B receives BPA(P1, K1), port B will initiate processing of the BPA. After the BPA has been processed, port B will send a copy of that BPA towards port D.

In this example, a segment port only unblocks if that segment port receives a BPA carrying the key that the receiving segment port generated. In the situation illustrated in FIG. 3A, no segment port receives a BPA containing the key generated by the receiving segment port. Accordingly, no segment ports will unblock.

When a BPA is processed by a segment protocol module within receiving network device, the segment port will compare the key in the BPA to the key of the receiving segment port. If the two keys are the same, the receiving segment port is put into a non-blocking state, such that the receiving segment port will begin forwarding data traffic normally.

Additionally, processing the BPA involves comparing the priority contained in the received BPA with the priority of the receiving segment port. Based on the outcome of this comparison, the segment protocol module will determine whether to send another BPA to the sender of the BPA. In this example, if the priority of the receiving segment port is greater than the priority contained within the BPA, the segment protocol module will cause a responsive BPA, containing the key that was in the received BPA, to be sent to the segment port that sent the received BPA.

Figure 3B:
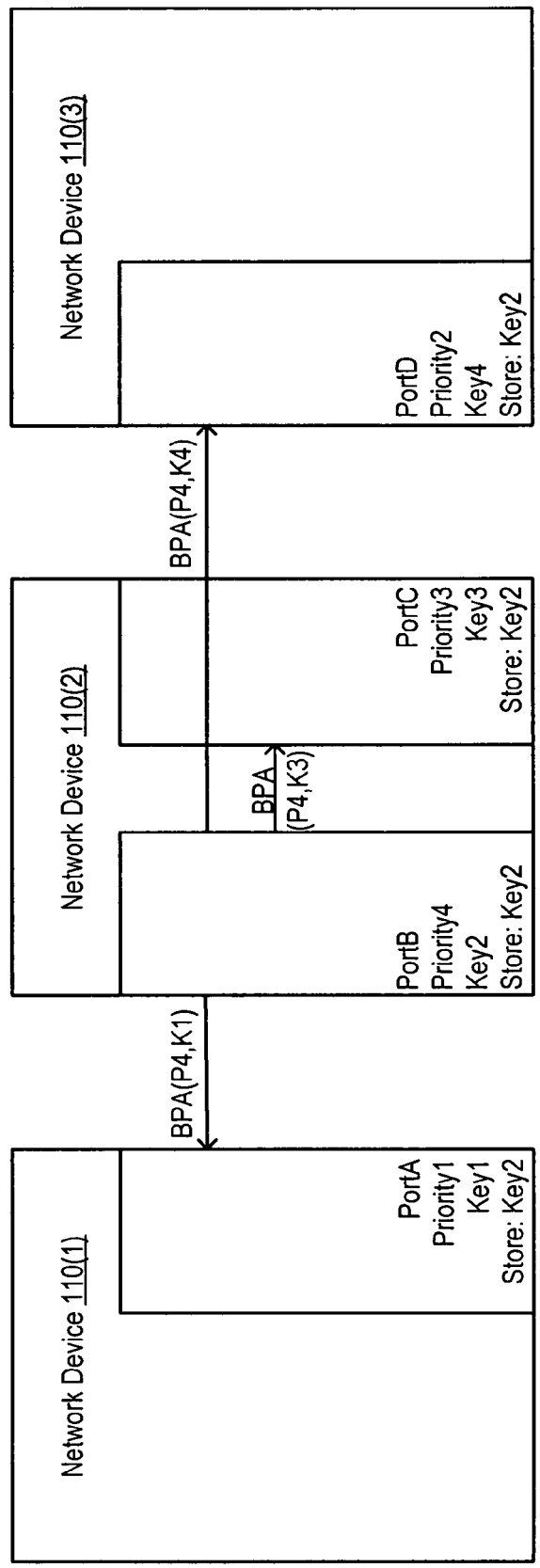

Thus, as shown in FIG. 3B, port B, which has the highest priority of the segment ports included in the network segment, will send responsive BPAs to each other segment port from which port B received a BPA (the other segment ports may also send one or more responsive BPAs; however, for simplicity, only responsive BPAs sent by port B are shown in this example). These responsive BPAs each contain the key of the segment port to which the responsive BPAs are being sent along with the priority of the sending segment port, port B.

For example, port B sends a responsive BPA(P4, K1) to port A, which (as shown in FIG. 3A) originally sent BPA(P1, K1) to port B. The responsive BPA contains the priority of the sending port, port B, and the key of the receiving port, port A. Port A initiates processing of BPA(P4, K1) and unblocks in response to the responsive BPA containing port A's key, key 1. Since the priority contained within the responsive BPA is higher than the priority (P1) of the receiving port (port A), network device 110(1) does not need to respond by sending another BPA.

Similarly, port B sends responsive BPA(P4, K3) to port C. The responsive BPA contains the priority P4 of the sending port, port B, and the key (K3) of the receiving port, port C. Port C initiates processing of BPA(P4, K3) and unblocks in response to the responsive BPA containing port C's key, key 3. Since the priority (P4) contained within the responsive BPA is higher than the priority (P3) of the receiving port (port C), network device 110(2) does not need to respond by sending another BPA to port B.

Port B also sends responsive BPA(P4, K4) to port D in network device 110(3). The responsive BPA contains the priority P4 of the sending port, port B, and the key (K4) of the receiving port, port D. Port D initiates processing of BPA(P4, K4) and unblocks in response to the responsive BPA containing port D's key, key 4. Since the priority (P4) contained within the responsive BPA is higher than the priority (P2) of the receiving port (port D), network device 110(3) does not need to respond by sending another BPA to port B.

In addition to determining whether to unblock and determining whether to send a responsive BPA, processing a received BPA involves storing a copy of a key contained within a received BPA. In one embodiment, all keys that are received from other segment ports are stored. In another embodiment, only the key of the segment port having the highest priority (e.g., as detected by identifying the key associated with the highest priority found within a received BPA) is stored. Thus, as shown in FIG. 3B, each segment port will store, at least, the key (key 2) of port B.

After the exchange of BPAs shown in FIGS. 3A and 3B, all segment ports other than port B will receive the key needed to unblock. Accordingly, the segment protocol has selected port B to remain blocked. This selection is effected through the exchange of segment protocol messages (the BPAs) and is based upon the priorities assigned to the segment ports within the network segment.

It is noted that other embodiments can use different techniques to select which segment port to block during normal operation of the network segment when connectivity is detected. For example, in one embodiment, segment ports can unblock in response to simply receiving a BPA from another segment port with a higher priority.

As noted above, a segment port that enters the failed state (e.g., due to the segment port detecting that the network device and/or link to which it is coupled has failed, or in response to the segment port detecting an error in its own operation or configuration) will begin operating in a blocked state. Since only one segment port per network segment needs to operate in a blocked state, a segment port that enters a blocked state can send appropriate segment protocol messages in an attempt to unblock any segment port that was previously blocked.

Figure 3C:
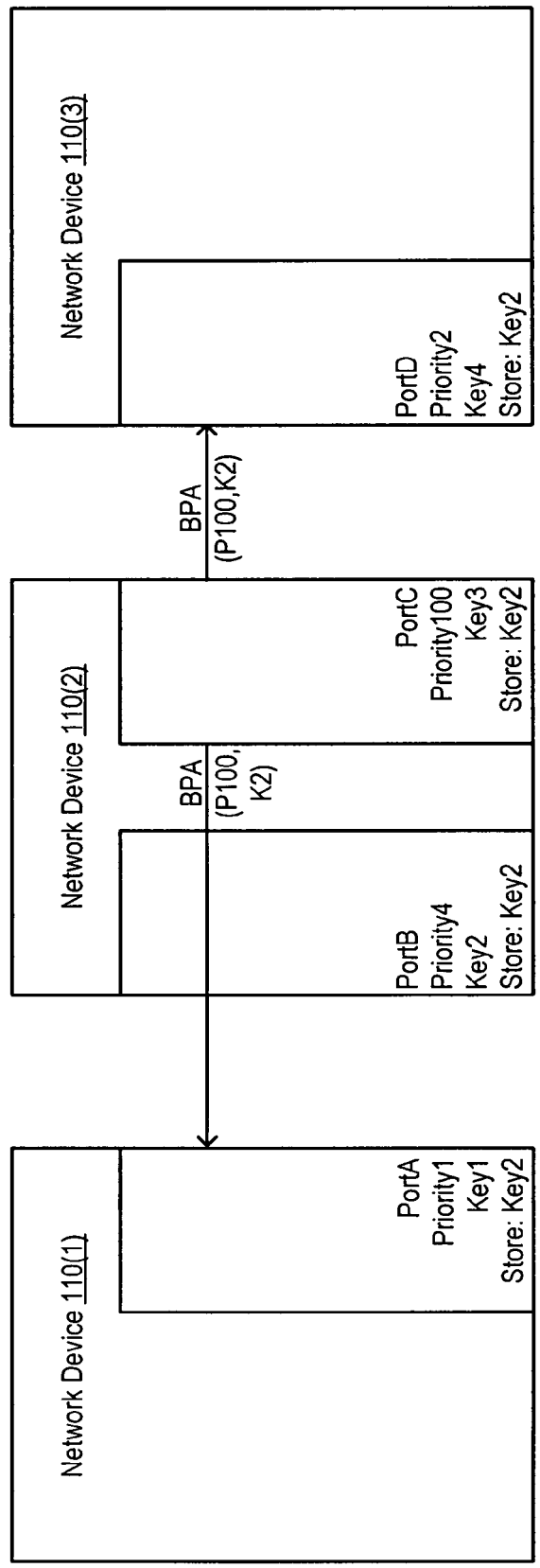

FIG. 3C illustrates a scenario in which segment port C has failed and entered a blocked state. As part of entering a blocked state due to a failure, the priority associated with segment port C has been increased to a value (100 in this example) known to exceed the priorities of all non-failed segment ports. This value can be prespecified as part of the segment protocol or by an administrator when the network segment is being configured.

In response to its change in state and/or priority, segment port C sends a new BPA, BPA(P100, K2), containing port C's new priority and the stored key K2 (this is the key of the segment port that previously had the highest priority). A copy of this BPA is sent towards each endpoint of the network segment, as shown in FIG. 3C. Receipt of the key has no effect on ports A and D, since these ports are already unblocked and will not need to send responsive BPAs. However, in some embodiments, the received BPA can also include the key (key 3) of the sending segment port, allowing receiving ports to store that key.

When port B receives the BPA, port B will initiate processing of the BPA. The segment protocol module performing this processing will determine that, since the BPA contains port B's key, port B can enter an unblocked state and begin forwarding data traffic normally. Since the priority in the BPA exceeds port B's priority, port B does not need to send a responsive BPA. As with ports A and D, port B may store a copy of the sending segment port's key, if included within the BPA. As a result of the new BPAs sent by port C, the blocked port effectively moves to the location of the failure.

Figure 4A:
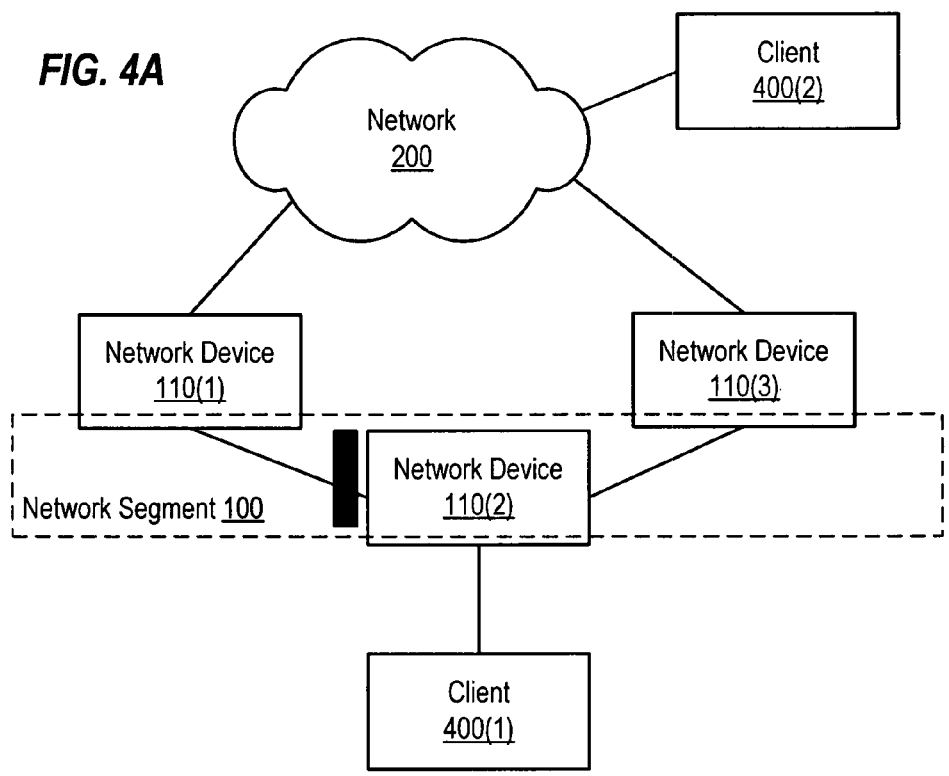
FIGS. 4A and 4B show how data traffic within a network that includes a network segment controlled by the segment control protocol is affected by a failure within the network segment, according to one embodiment of the present invention.
Figure 4B:
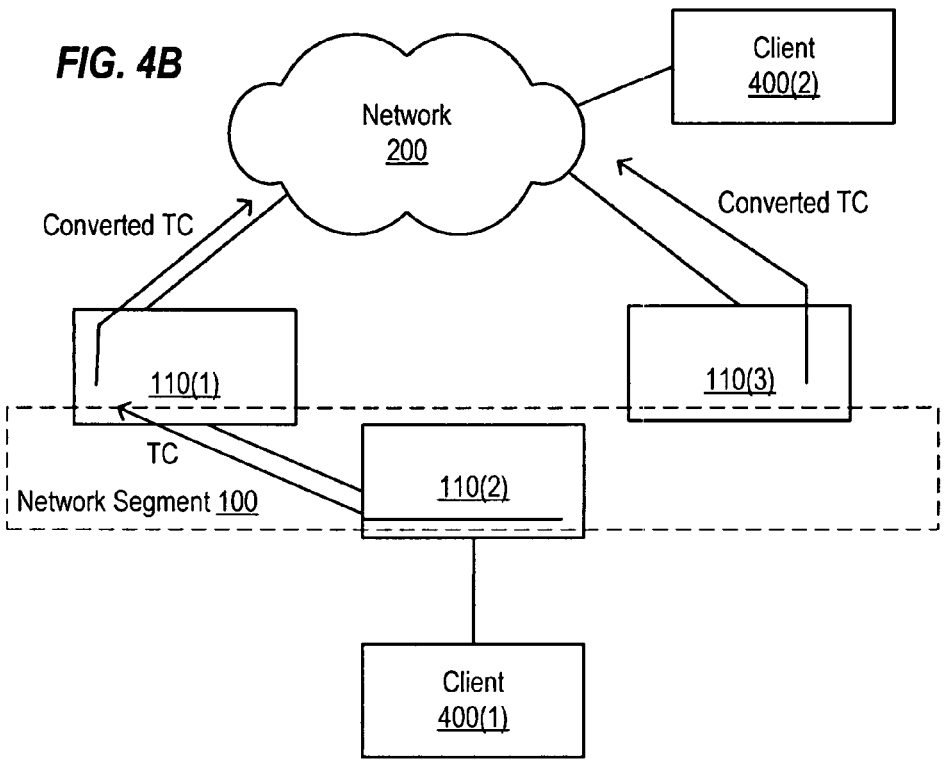

FIGS. 4A and 4B show how data traffic within a network that includes a network segment controlled by the segment control protocol is affected by a failure within the network segment. As shown in FIG. 4A, network segment 100 includes segment ports within network devices 110(1), 110(2), and 110(3). Network devices 110(1) and 110(3) are coupled by network 200. Client 400(1) is coupled to network device 110(2) and client 400(2) is coupled to network 200. Network segment 100 provides redundancy to the hosts within its boundaries. Accordingly, such hosts can reach the rest of the network through either network device 110(1) or network device 110(3).

In FIG. 4A, the network segment is fully operational. Accordingly, the segment protocol has blocked the segment port within network device 110(2) that is coupled to network device 110(1). This blocked port is represented by the solid bar on the left side of network device 110(2) in FIG. 4A. Since the blocked port will not forward data traffic from network device 110(2) to network device 110(1), any data traffic being sent from client 400(1) to client 400(2) needs to be communicated from network device 110(2) to network device 110(3). Similarly, any data traffic sent from client 400(2) to client 400(1) needs to be sent via network device 110(3) to network device 110(2) since the blocked port will drop all data traffic from network device 110(1).

Forwarding tables within network components such as network devices 110(1), 110(2), and 110(3) can identify the ports used to reach clients 400(1) and 400(2). For example, a forwarding table within network device 110(1) can indicate that client 400(1) is reachable via the port coupled to network 200. Based on this forwarding table information, network device 110(1) will forward messages to client 400(1) via network 200. For example, if a message addressed to client 400(1) is received by network device 110(1), network device 110(1) will forward that message via the port coupled to network 200, based upon the information in the forwarding table. If the forwarding table does not contain any information identifying the port associated with a particular destination address, a message addressed to that destination address will be "flooded," or forwarded from all ports in the same virtual local area network (VLAN), except for the port that received the message.

In FIG. 4B, the link between network devices 110(2) and 110(3) has failed. Accordingly, the two segment ports coupled by this link have entered failed states and begun blocking data traffic. The entry of these segment ports in the failed state can also cause the forwarding tables within network devices 110(2) and 110(3) to be flushed, such that any information used to forward messages to segment ports is removed. The failed segment ports can each send one or more BPAs (as described above in the context of FIGS. 3A-3C) towards each end of the network segment. Since the link itself has failed, no BPAs can be sent from network device 110(2) to network device 110(3) and vice versa.

As described above, BPA messages can be used as topology change (TC) notifications. In some embodiments, each BPA message can include information that indicates whether the BPA is a TC notification. For example, a BPA message can include a field or bit whose value indicates whether the BPA message is being sent as a topology change message. Accordingly, if that field or bit is set to the appropriate value, the BPA will be interpreted as a topology change notification (thus causing the receiving device to flush forwarding information).

Thus, in the above-described example, the segment protocol uses a single protocol message as both a BPA and a TC. By combining the TC and BPA, fewer segment protocol messages need to be sent, and both effects (unblocking the previously blocked segment port and flushing forwarding information) of the topology change can be realized at substantially the same time.

In addition to sending BPAs to unblock the previously blocked network segment port, the edge devices (devices that contain an endpoint segment port) may also send topology change notifications (abbreviated "TC" in FIG. 4B) towards other network segments (or non-segment networks), if those edge devices have been configured to do so. These topology change notifications can be segment protocol messages that alert other segment ports to the fact that the topology of the originating network segment has changed (e.g., in this situation, the topology change is the movement of the blocked port from one location to another) or they could be TC notifications of other loop prevention protocols like Spanning Tree TCNs. When a topology change indication is processed, it causes the receiving network device to flush its forwarding tables of forwarding information related to the network segment (e.g., by flushing all forwarding information that identifies the port that received the TC as the outgoing port for a particular destination address).

As shown in the illustrated example, the newly-failed segment port in network device 110(2) sends a TC (in the form of a segment protocol BPA) to the other segment port in network device 110(2). This segment port was previously blocked (as shown in FIG. 4A); however, receipt of the BPA causes this segment port to unblock. Accordingly, this segment port will process the TC and regenerate the TC.

The segment port within network device 110(2) then forwards the TC to the segment port in network device 110(1). This receiving segment port processes the TC, which causes network device 110(1) to flush its forwarding tables as described above.

Since the receiving segment port in network device 110(1) is also an endpoint of the network segment, this segment port can (in at least some embodiments) convey the TC into network 200, since some forwarding information within the network (e.g., such as the forwarding information used to convey messages between clients 400(1) and 400(2)) also needs to be flushed. When the segment port is initially configured as an endpoint segment port, additional configuration information identifying (a) where (e.g., in terms of outgoing ports) TCs should be forwarded and (b) whether that TC should be converted for use by another protocol can also be provided as part of the configuration information. This configuration information can then be used when processing TCs received from the network segment. If the TCs are implemented using BPAs, only BPAs that are also TCs will be sent from the network segment by segment endpoints.

In the illustrated embodiment, when the TC is processed by network device 110(1), the TC is converted into another type of TC message (e.g., the segment protocol TC can be converted into a TC appropriate for use with STP) and forwarded via the port coupled to network 200. This converted TC can then be conveyed within network 200 according to the appropriate protocol being used within network 200. Similarly, since the now-failed segment port within network device 110(3) is a segment endpoint, network device 110(3) can also send a converted TC to network 200.

The use of the converted TC allows forwarding information within network 200 that is inconsistent with the new topology of the network segment to be flushed. Messages conveyed between clients 400(1) and 400(2) will temporary be flooded after the flush; however, this prevents those messages from being lost, which is what might have happened if the preexisting forwarding information (which was based on the prior topology of the network segment) had been used to forward those messages.

It is noted that, if one network segment is connected to another network segment that is operating according to the segment protocol, the TC (e.g., in the form of a BPA) can be forwarded to the neighboring segment without being converted to another format. The TC will be forwarded and processed by the segment ports in the neighboring segment, causing network devices in the neighboring segment to flush forwarding information. However, the segment ports in the neighboring segment will not change their blocking status (from blocked to unblocked or vice versa) based on a TC that originated in another network segment.

In one embodiment, BPAs (as well as other segment protocol messages) contain information identifying their segment of origin. Each network segment within a networking environment is assigned a unique identifier, and the identifier assigned to a particular segment is used within any segment protocol messages sent within that segment. A segment port that receives a segment protocol message will compare the segment identifier within the segment protocol message to its own segment identifier; if the two segment identifiers are the same, the segment port will cause the segment protocol message to be processed normally. Otherwise, the segment protocol message will not be processed, or will receive limited processing. For example, a network segment TC normally may cause a network device to both flush forwarding information and to unblock a blocked segment port, if any. A network segment TC received from another segment will only cause forwarding information to be flushed, however.

It is noted that the propagation of messages in the control plane, such as the BPAs and TCs described in FIG. 4A, from one point in a network segment to another may take significantly longer than the propagation of messages in the data plane. As noted above, messages being conveyed in the control plane require control processing before being regenerated and/or forwarded to the next network device, while messages being conveyed in the data plane do not. This extra delay in handling messages in the control plane can, in some situations, lead to a longer than desirable convergence time (e.g., time taken to unblock the previously blocked port and flush potentially incorrect forwarding information).

In order to expedite convergence, some embodiments can implement two types of BPA and/or TC control messages (for simplicity, only TCs are described; however, the following discussion can apply to both types (control plane and data plane) of control messages as well as to combined TC and BPA messages). One type is sent in the control plane (as described above), while another is sent in the data plane.

The control plane TC will be processed by each intervening network device before being converted (e.g., for transmission outside of the network segment) and/or forwarded; however, this TC will also be able to be forwarded by the blocked segment port. The other TC is sent in the data plane and, as such, is not processed before being forwarded. The TC being sent in the data plane will initially be dropped by the blocked segment port (as described below, however, a copy of the TC can be saved and subsequently processed). Since the data plane TC will be forwarded as regular data traffic, it is likely to propagate more quickly through the network segment as well as any networks (such as network 200) to which the network segment is coupled. The data plane TC can be forwarded back to the network segment via the intervening network(s) coupling the endpoints of the network segment.

Thus, in one embodiment, two types of TCs control messages are triggered by link failures. First, a TC is sent in the control plane. This TC is sent in the control plane by sending the TC (e.g., as implemented in a BPA message) to a class address associated with the segment protocol. When a segment port receives this type of TC, the segment port will generate an interrupt that triggers control plane processing on the TC. The control plane processing can regenerate the TC for transmission within the network segment or convert the TC into an appropriate topology change indication for transmission outside of the network segment. This type of TC is not forwarded until control plane processing has completed.

The second type of TC is sent in the data plane. This TC is sent to a multicast address and is handled as special control traffic by the data plane processing within the segment ports. Since this type of TC is sent in the data plane, this TC will not go through blocked segment ports. When this type of TC is handled by a segment port, the segment port itself will parse certain information in the TC header and, if this information identifies the data message as a segment protocol TC, the segment port can generate an interrupt to a processing module (e.g., a segment protocol module). The TC is forwarded before the interrupt is handled. A copy of the TC is saved and processed by the processing module in response to the interrupt. When this processing occurs, the processing module can cause the appropriate forwarding information to be flushed and/or the segment port to be unblocked.

Accordingly, a special control message that is a combined BPA and TC can be sent by network device 110(3) in the data plane and forwarded to network device 110(1) via network 200, and then forwarded to network device 110(2) by network device 110(1). When this data plane message is received by the segment port in network device 110(2), that segment port can recognize that the data message is a segment protocol message and generate an interrupt. If the segment port is still blocked (e.g., if the control plane BPA and/or TC has not yet reached this port), the data plane message will be dropped. However, when the interrupt is handled and the saved copy of the data plane message is processed, the receiving segment port will be unblocked. If the special control message does not successfully traverse network 200, however, receipt of the control plane message sent by the failed segment port within network device 110(2) (which was formerly coupled to network device 110(3)) will cause the blocked port within network device 110(2) to unblock. Thus, either the data plane message or the control plane message will unblock the previously blocked port VLAN Load Balancing A network segment can select to block different segment ports for data traffic in different Virtual Local Area Networks (VLANs). For example, the available VLANs (e.g., as identified by a numeric range representing the number of available VLANs) will be subdivided into several groups of one or more VLANs such that the union of the several groups represents all possible VLANs. For each group, a different segment port can be selected as the blocked segment port. Looking back at FIG. 1, for example, instead of selecting a single segment port (B) to block for all VLANs, segment port A can be selected to block for a first group of VLANs and segment port B can be selected to block for a second group of VLANs. As noted above, an administrator can configure the priority of the segment ports in such a way that those segment ports will be selected as blocked ports during normal operation.

By selecting different segment ports to block for different VLANs, the network device used to exit the network segment can be chosen (at least in part) on a per-VLAN basis. This increases an administrator's ability to select the network device used to exit the network segment on a per-VLAN basis. For example, if port A is blocked for one set of VLANs, traffic in those VLANs will exit the network segment via network device 110(3). Similarly, if port D is blocked for the remaining VLANs, all traffic in those VLANs will exit the network segment via network device 110(1).

Thus, by selecting different segment ports to block data traffic in different VLANs, traffic within the network segment can be load-balanced on a per-VLAN basis. In the example provided herein, one or more of the segment ports to block are endpoints; however, any segment port (endpoint or non-endpoint) can be selected as the blocked port for a given set of one or more VLANs.

In one embodiment, different segment ports will block different VLANs based upon VLAN configuration information provided by an administrator. This VLAN configuration information can, in one embodiment, be entered on one or both of the network devices that include an endpoint of the network segment. The administrator can also configure the priority of the segment ports so that one segment port (e.g., the endpoint segment port in the network device that maintains the VLAN configuration information) has a higher priority than the others. In one embodiment, the VLAN configuration information is entered on the same network device that includes the endpoint with the highest priority.

As noted above, by sending an EPA to the other endpoint, each endpoint segment port ensures that all other segment ports (including the other endpoint segment port) will recognize each other's presence within the network segment and detect that the network segment is operational. The EPAs sent from each endpoint to each other can also be used by the endpoint segment ports to elect a primary endpoint. For example, each endpoint segment port can include its priority in the EPA it sends to the other endpoint segment port. Based on the endpoint segment ports' respective priorities, one endpoint (e.g., the endpoint with the highest priority) is elected the primary endpoint segment port.

The BPAs noted above can be used to convey the VLAN configuration information from the primary endpoint segment port to another segment port. As noted above, the VLAN configuration information can be maintained on the network device that includes the primary endpoint segment port. This primary endpoint segment port can initially block all data traffic. When this segment port unblocks (e.g., in response to receiving a BPA, as described above), the segment port will continue to block data traffic in a range of one or more VLANs, which are specified in the VLAN configuration information. The primary endpoint segment port can then send a BPA, containing information included identifying the range of VLANs being blocked by the primary endpoint segment port, to the segment port that was selected as the blocked port. This BPA will cause the blocked segment port to unblock for the identified VLANs (alternatively, the BPA can identify the VLANs that the blocked segment port should continue to block).

If the remaining range of VLANs is to be blocked at the other (non-primary) endpoint segment port, the primary segment port can also send another segment protocol message identifying the remaining range of VLANs to the other endpoint. In response to receiving this message, the other endpoint will block the identified range of VLANs (alternatively, the segment protocol message can identify the range of VLANs blocked by the primary endpoint, and the other endpoint will block the remaining VLANs). The other endpoint can then send a BPA to the blocked segment port that causes the blocked segment port to cease blocking data traffic in the range of VLANs now blocked by the other endpoint.

Figure 5:
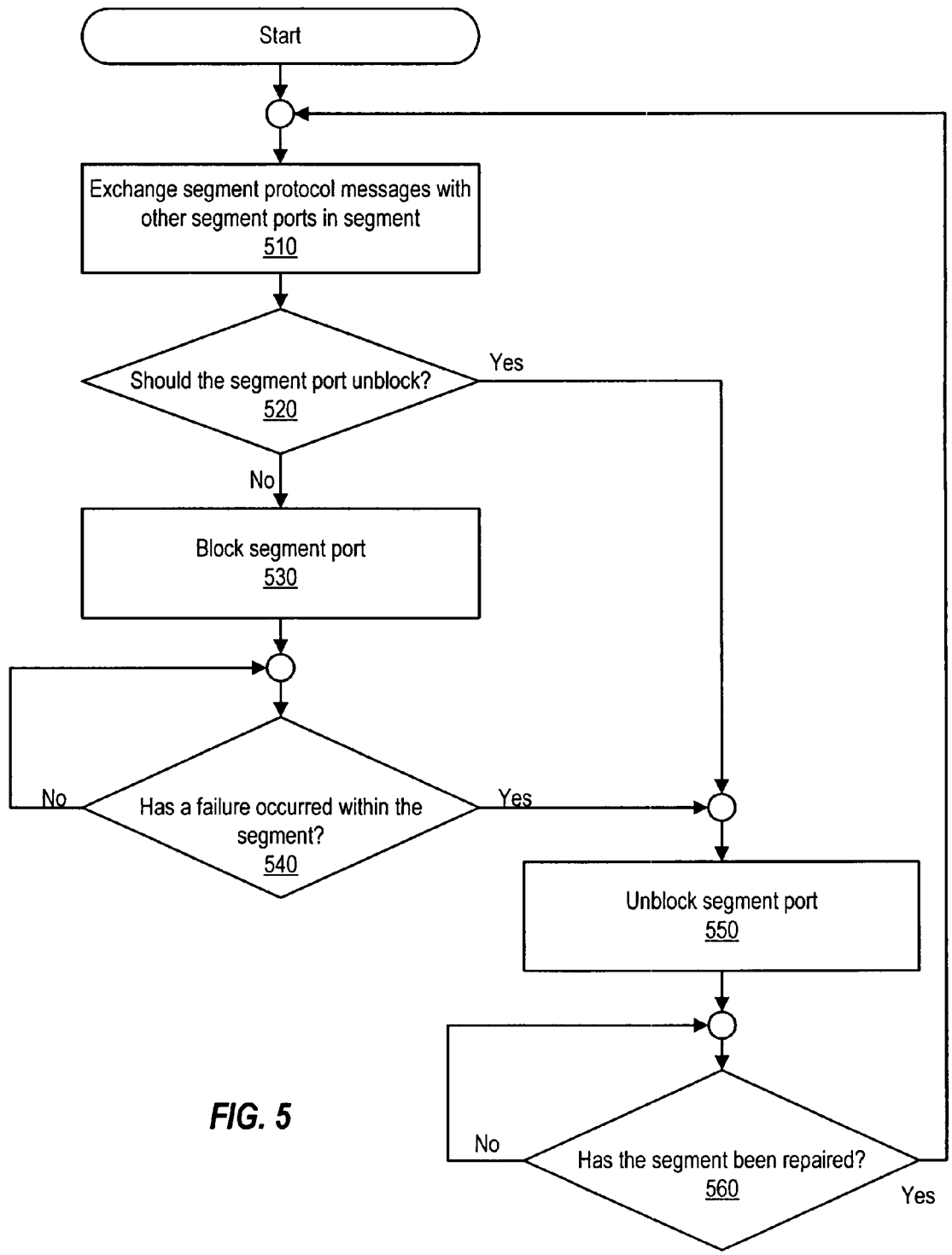
FIG. 5 is a flowchart of a method of operating a segment port according to the segment protocol, according to one embodiment of the present invention.

FIG. 5 is a flowchart of a method of operating a segment port of a network device that supports a segment protocol. This method can be performed by a port, which has been configured as a segment port, within a device such as network devices 110(1)-110(3) of FIGS. 1, 2, 3A-3C, and 4A-4B.

As shown, the method begins at 510, when the port exchanges segment protocol messages with other segment ports. Initially, the port operates in a blocked state, where the port blocks all data traffic.

Based on the exchanged segment protocol messages, the port determines whether it is being selected as the blocked port within the network segment. The exchanged messages can also indicate whether the network segment is fully operational. If the exchanged messages indicate that the port should unblock, as indicated at 520, the port unblocks (550) and begins forwarding data traffic normally. For example, if the port receives a segment protocol message indicating that the port is not the highest priority port within the network segment, the port can unblock. It is noted that, in certain situations, the port may unblock for some, but not all, VLANs.

If the exchanged messages indicate that the port should block, the segment port continues to operate in a blocked state, as indicated at 530. In this state, the port will continue to block until another port within the network segment sends a segment protocol message that indicates that the other port is now blocking. This scenario can occur if the other port enters a failed state, since ports in a failed state will block all data traffic and will also send segment protocol messages (as control and/or data traffic) to unblock the previously blocked port.

Thus, if a failure occurs within the network segment, as shown at 540, the blocked port can unblock, as shown at 550. If the failure is repaired, operations 510 and 520 can be repeated to determine whether the port should again block once the network segment is again fully operational.

Figure 6:
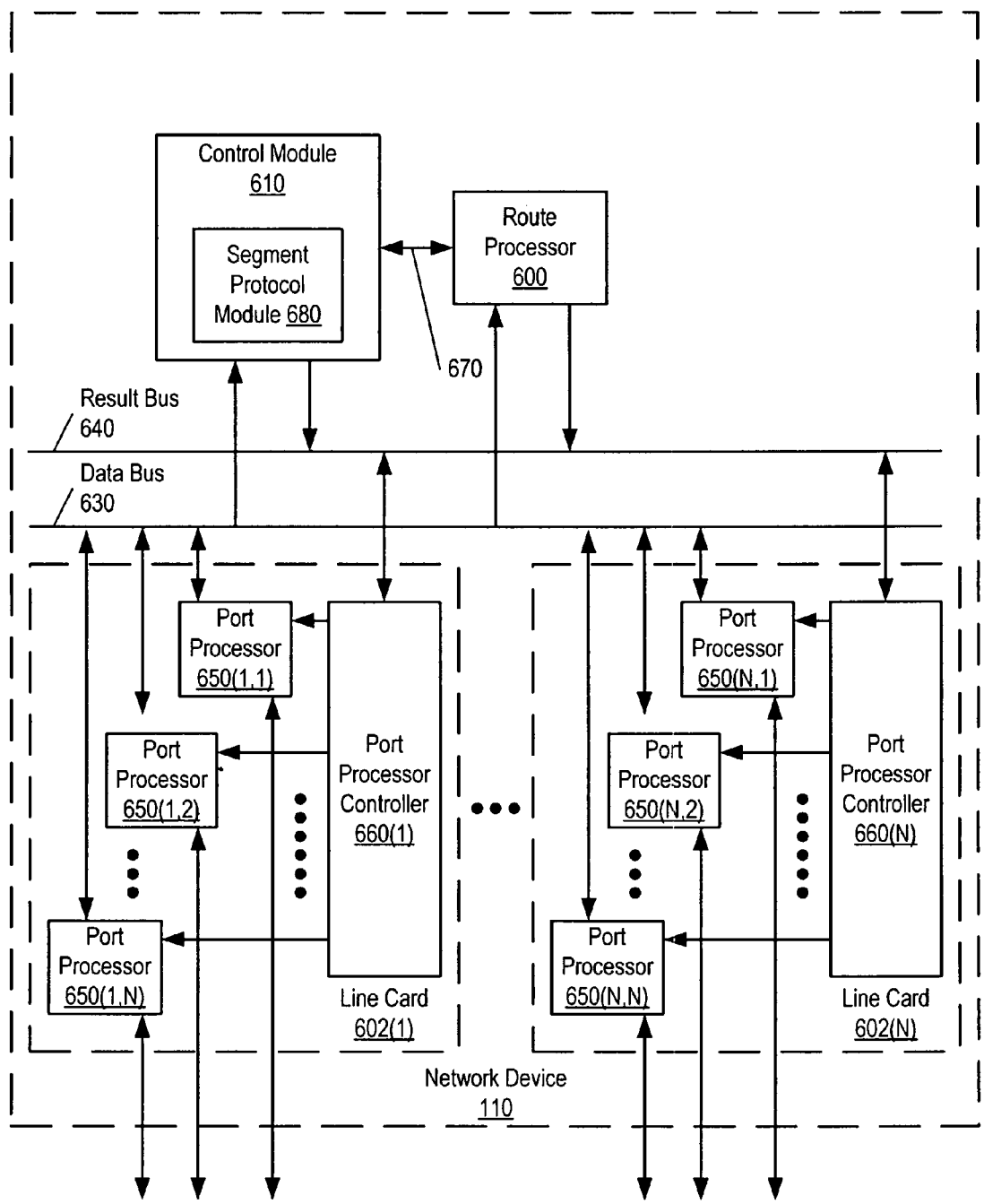
FIG. 6 shows a block diagram of a network device that supports a segment protocol, according to one embodiment of the present invention.

FIG. 6 shows a block diagram of a network device that supports a segment protocol. It is noted that this diagram is presented by way of example only; other embodiments may be implemented in a significantly different manner.

FIG. 6 is a block diagram of a network device 110 (e.g., one of network devices 110(1)-110(2) of FIGS. 1, 2, 3A-3C, and 4A-4B). In this depiction, network device 110 includes a number of line cards (line cards 602(1)-602(N)) that are communicatively coupled to a control module 610 and a route processor 600 via a data bus 630 and a result bus 640. Certain components, such as route processor 600, can be eliminated depending upon the desired functionality of network device 110.

Control module 610 includes forwarding engine functionality as well as functionality to implement segment protocol module 680. In alternative embodiments, all or part of segment protocol module 680 can be implemented by route processor 600. Additionally, some of the functionality of segment protocol module 680 can be distributed to one or more port processors 650(1,1)-650(N,N) and/or port processor controllers 660(1)-660(N), as described in more detail below.

Segment protocol module 680 is configured to implement a segment protocol that detects connectivity within a network segment and selectively blocks a segment port within the network segment if connectivity is detected. Segment protocol module 680 is configured to process segment protocol messages received from other network devices and/or to generate segment protocol messages to be sent to other network devices. Segment protocol module 680 is also configured to cause a particular segment port to enter and/or leave a blocked state, dependent upon the segment protocol messages exchanged with other segment ports. Such segment protocol messages can identify failures within the segment as well as whether a particular segment port has been selected as the blocked segment port.

In one embodiment, segment protocol module 680 is configured to cause all segment ports within network device 110 to block data traffic when network device 110 is initially powered on. During this time, the segment ports within network device 110 exchange segment protocol messages with other segment ports in the same network segment. These segment protocol messages are used to perform functions such as electing a port to be the blocked port (e.g., using BPAs that indicate priority, as described above), determining connectivity within the segment (e.g., using BPAs and/or EPAs), and so on.

Line cards 602(1)-602(N) include a number of port processors 650(1,1)-650(N,N) which are controlled by port processor controllers 660(1)-660(N). It will also be noted that control module 610 and route processor 600 are not only coupled to one another via data bus 630 and result bus 640, but are also communicatively coupled to one another by a communications link 670. It is noted that in alternative embodiments, each line card can include a forwarding engine (as opposed to having a centralized forwarding engine within control module 610). In such alternative embodiments, all or part of segment protocol module 680 can also be included on each line card. Additionally, all or part of the functionality of segment protocol module 680 can be implemented within a port processor controller (e.g., one of port processor controllers 660(1)-660(N)). For example, the functionality needed to operate a particular port processor as a segment port can be included in the appropriate port processor controller.

When a message is received, the message is identified and analyzed by a network device such as network device 110 in the following manner. Upon receipt, a message (or some or all of its header and/or control information) is sent from the one of port processors 650(1,1)-650(N,N) at which the message was received to one or more of those devices coupled to data bus 630 (e.g., others of port processors 650(1,1)-650(N,N), control module 610 and/or route processor 600). Handling of the message can be determined, for example, by control module 610. For example, based upon information in the message's header and information in a forwarding table, control module 610 may determine that the message should be forwarded to one or more of port processors 650(1,1)-650(N,N). This can be accomplished by indicating to corresponding one(s) of port processor controllers 660(1)-660(N) that a copy of the message held in the given one(s) of port processors 650(1,1)-650(N,N) should be forwarded to the appropriate one of port processors 650(1,1)-650(N,N). If a message is a segment protocol message or a data message containing segment protocol information, the receiving port processors 650(1,1)-650(N,N) and/or port processor controller 660(1)-660(N) can generate an interrupt that triggers control processing of the message by control module 610. If the message is a control message being conveyed in the control plane (e.g., as indicated by the destination address of the message), forwarding of the message is delayed until the control processing has completed.

In the example of FIG. 6, one or two port processors 650(1,1)-650(N,N) can be configured as segment ports for the same network segment. Configuration information (e.g., as stored in one or more registers associated with each port processor) associated with the selected port processors 650(1,1)-650(N,N) can indicate that the selected port processors 650(1,1)-650(N,N) are segment ports. The configuration information can also indicate the priority of each segment port and identify the network segment in which those segment ports are participating. The configuration information indicates that the blocking behavior of these segment ports will be controlled by the segment protocol instead of by another loop prevention protocol.

Figure 7:
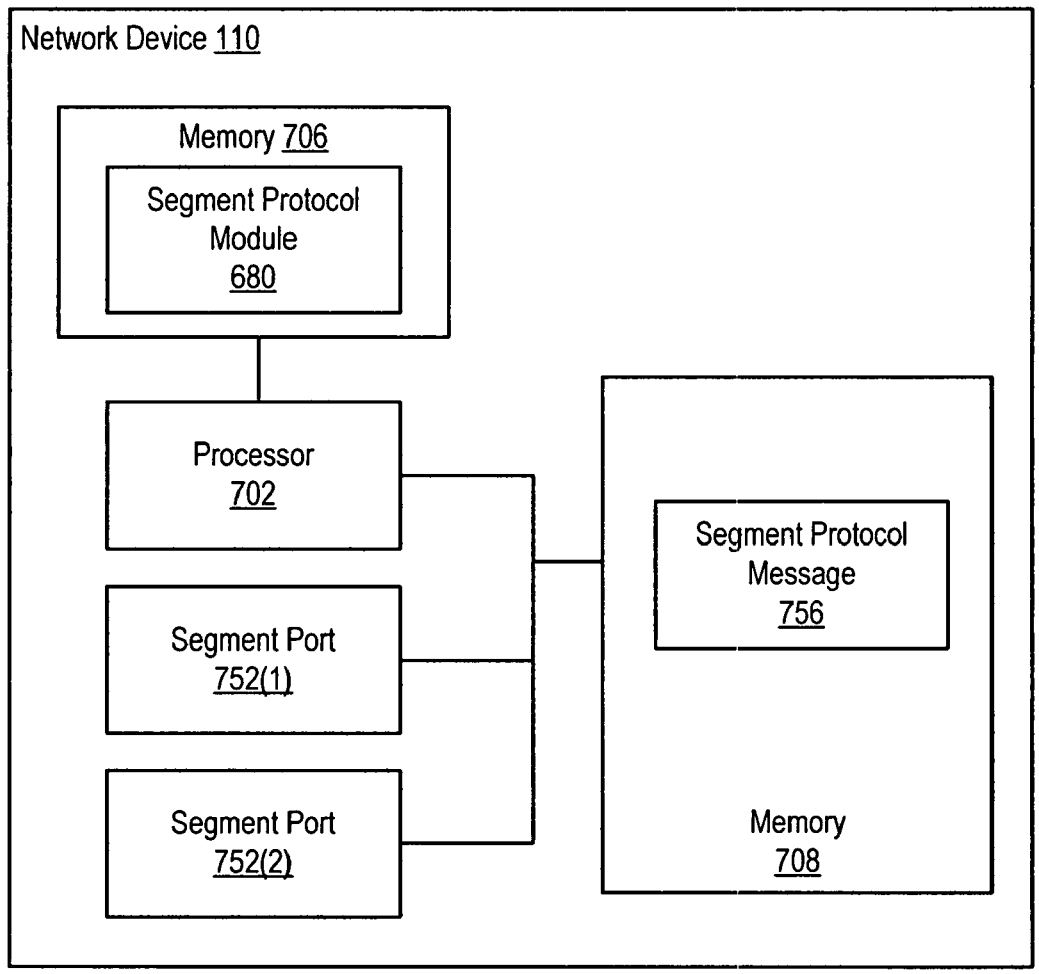
FIG. 7 is a block diagram of a network device that implements a segment protocol module in software, according to one embodiment of the present invention.

FIG. 7 shows a block diagram of a network device 110 (e.g., one of network devices 110(1), 110(2), or 110(3) of FIG. 1, 2, 3A-3C, or 4A-413) that supports a segment protocol. As shown, network device 110 includes a segment protocol module 680. Control module 30 is coupled to two segment ports 752(1) and 752(2).

FIG. 7 illustrates how segment protocol module 680 can be implemented in software. As illustrated, network device 110 includes one or more processors 702 (e.g., microprocessors, PLDs (Programmable Logic Devices), or ASICs (Application Specific Integrated Circuits)) configured to execute program instructions stored in memory 706. These program instructions include instructions executable to implement segment protocol module 680. Memory 706 can include various types of RAM (Random Access Memory), ROM (Read Only Memory), Flash memory, MEMS (Micro Electro-Mechanical Systems) memory, and the like. Processor 702 and memory 706 can be included in a port processor (e.g., port processors 650(1,1)-650(N,N) of FIG. 6), a port processor controller (e.g., port processor controllers 660(1)-660(N) of FIG. 6), a control module or forwarding engine (e.g., control module 610 of FIG. 6), or a route processor (e.g., route processor 600 of FIG. 6). Processor 702 and memory 706 are coupled to send and receive data and control signals by a bus or other interconnect.

Network device 110 also includes two segment ports 752(1) and 752(2). These ports are configured as segment ports in a network segment and are controlled by the segment protocol module 680 based upon segment protocol messages exchanged with other segment ports in the network segment. In response to receiving a segment protocol message 756 or a data message that contains segment protocol information, a segment port 752(1) or 752(2) can store a copy of the segment protocol message 756 in memory 708. The receiving port can also notify segment protocol module 680 that a segment protocol message has been received (e.g., by generating an interrupt to processor 702). Segment protocol module 680 can then access the segment protocol message and, if needed, cause the segment port that received the message to resend the received segment protocol message (or a new segment protocol message) or cause the segment protocol message to be forwarded or dropped as appropriate. Processor 702, ports 752(1) and 752(2), and memory 708 are coupled to send and receive data and control signals by a bus or other interconnection.

In this example, program instructions executable to implement segment protocol module 680 are stored in memory 706. The program instructions and data implementing segment protocol module 680 can be stored on various computer readable media such as memory 706. In some embodiments, segment protocol module software is stored on a computer readable medium such as a CD (Compact Disc), DVD (Digital Versatile Disc), hard disk, optical disk, tape device, floppy disk, and the like). In order to be executed by processor 702, the instructions and data implementing segment protocol module 680 are loaded into memory 706 from the other computer readable medium. The instructions and/or data implementing segment protocol module 680 can also be transferred to network device 110 for storage in memory 706 via a network such as the Internet or upon a carrier medium.

The term "message" is used throughout this disclosure to refer to a logical grouping of information sent as a data unit over a transmission medium. Messages may include header and/or trailer information that surrounds user data contained in the data unit. For purposes of this disclosure, a "message" may include a cell, datagram, frame, packet, segment, or any other logical group of information.

Throughout this document, the term "spanning tree protocol" and the abbreviation "STP" are used to generically refer to any network protocol that prevents loops within a network having redundant links by defining a tree that spans all network devices within the network. For example, the term "spanning tree protocol" can be used to describe network protocols implemented according to IEEE Standards 802.1D, 802.1q, 801.2s, and 802.1w. Similarly, the term "spanning tree protocol" can be used to describe Rapid Spanning Tree Protocol (RSTP), Multiple Spanning Tree Protocol (MSTP), per Virtual Local Area Network (VLAN) Spanning Tree (PVST and PVST+) and per VLAN rapid spanning tree (PVRST and PVRST+).

Load Balancing

Figure 8A:
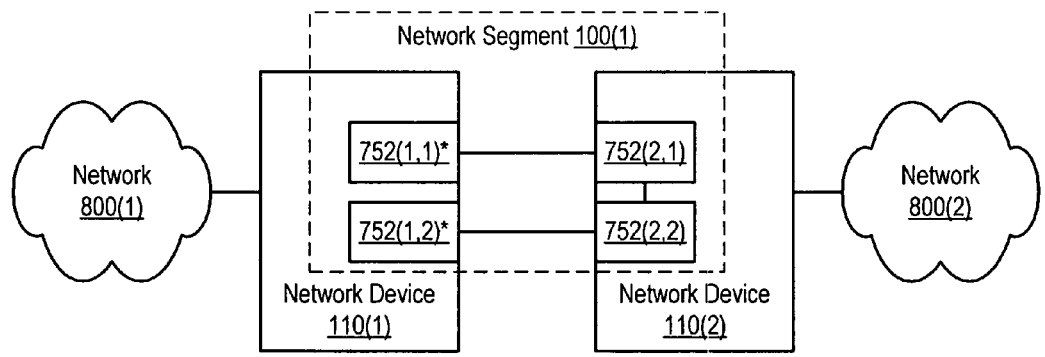
FIGS. 8A and 8B illustrate how the segment protocol can be used to perform link aggregation, according to one embodiment of the present invention.
Figure 8B:
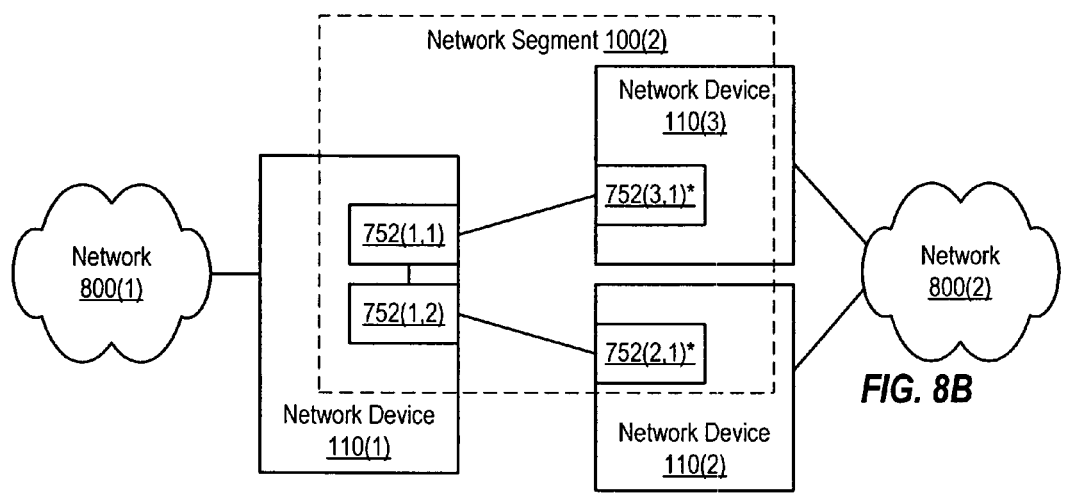

The segment protocol described above (or a similar loop-prevention protocol that operates on a network segment) can be used to load-balance traffic on redundant links between any two switches. FIGS. 8A and 8B illustrate how the segment protocol can be used to perform link aggregation, according to one embodiment of the present invention. In these figures, each segment endpoint is marked with an asterisk (*).

In FIG. 8A, a network segment 100(1) is configured using ports included in a pair of network devices 110(1) and 110(2). Network device 110(1) includes ports 752(1,1) and 752(1,2), which have both been configured as segment ports within network segment 100. Similarly, network device 110(2)

includes ports 752(2,1) and 752(2,2), which are also configured as segment ports within network segment 100(1).

Network devices 110(1) and 110(2) provide connectivity between networks 800(1) and 800(2). In this example, network segment 100(1) provides two links between the network devices. If additional links are needed between network devices 110(1) and 110(2), one or more additional network segments (each providing two more links) can be configured.

In this example, the two endpoints of network segment 100(1) are segment ports 752(1,1) and 752(1,2) in network device 110(1). Network segment 100(1) includes two links that form a redundant connections between network devices 110(1) and 110(2): one between segment ports 752(1,1) and 752(2,1) and another between segment port 752(1,2) and 752(2,2). These two links back each other up, such that if one link is brought down by a failure, the other link can continue to convey messages between the two network devices.

Network segment 100(1) is controlled by the segment protocol described above. This segment protocol detects connectivity within network segment 100(1) and selects port(s) to block (e.g., on a per-VLAN basis) when connectivity is detected.

As described above, the segment protocol allows different ports to be selected to block for different VLANs. For example, segment port 752(1,1) can be selected to block data traffic in a first range of VLANs and segment port 752(1,2) can be selected to block data traffic in the remaining VLANs.

In order to provide a more comprehensive load-balancing solution, the segment protocol's selection of ports to block can be expanded so that multicast, broadcast, and unknown unicast data traffic (i.e., unicast data traffic with an unknown destination address, which will cause that traffic to be flooded over the network segment) are not sent over a link that is blocked at the other end. For example, using the blocking pattern above, the segment ports can be blocked so that segment port 752(2,1) will block data traffic in the range of VLANs blocked by 752(1,1). This prevents traffic in that range of VLANs from consuming any of the bandwidth of the link that couples segment ports 752(1,1) and 752(2,1).

Thus, the segment protocol will operate to detect whether a particular VLAN is blocked at one end of a link and, if so, the segment protocol will preemptively block that VLAN at the other end of the link. In one embodiment, this behavior is implemented using the EPA messages described above. Each segment port coupled to an endpoint segment port can detect whether it is coupled to an endpoint segment port using information contained in the EPA messages.

As noted above, EPA messages are segment protocol messages sent by each endpoint segment port. An EPA message is propagated from one segment port to another in the network segment until the EPA message reaches the other endpoint segment port. Each time the EPA message is received by a non-endpoint segment port, information identifying the receiving segment port is appended to the EPA message. While a network device is processing an EPA message, the network device can also store the information contained in the EPA message (this information can be used to detect connectivity as well as for the purpose of command line interface (CLI) display and debug purposes).

Accordingly, after processing at least one EPA message in each direction (e.g., one EPA message sent from one endpoint and another EPA message sent from the other endpoint), each intermediate network device will have information identifying all segment ports within the network segment. This information can be generated by combining the information received from the EPA message traveling in one direction with the information received from the EPA message traveling in the other direction. The information can be combined by concatenating an order-reversed set of information obtained from one EPA to the non-reversed information obtained from the other EPA. For example, an EPA sent by segment port 752(1,1) that is received by segment port 752(2,1) will identify the sending segment port 752(1,1). An EPA sent by segment port 752(1,2) that is received by segment port 752(2,1) will identify segment ports 752(1,2) and 752(2,2). Accordingly, based on these EPAs, the composition and order of the network segment can be identified as segment ports 752(1,1), 752(2,1) (the segment port that received the EPA messages traveling in each direction), 752(2,2), and 752(1,2).

Using the information that identifies the segment ports within the network segment, a network device can determine whether any of its segment ports are coupled to endpoint segment ports. If so, the network device can cause each segment port coupled to an endpoint to block the same range of VLANs as the endpoint segment port to which the segment port is coupled.

As noted above, when per-VLAN load balancing is performed, one endpoint can send an EPA and/or BPA message identifying the range of VLANs blocked by that endpoint. In one embodiment, this information is encoded as a bitmap that represents a list of VLANs. Intermediate (i.e., non-endpoint) segment ports can detect and save this information and use the information, if needed, to determine which VLANs to block when coupled to an endpoint segment port.

For example, endpoint segment port 752(1,1) can send an EPA indicating that endpoint 752(1,1) is blocking VLANS 1-2000 to endpoint 752(1,2) in order to cause endpoint 752(1,2) to block the complementary range of VLANs (e.g., VLANs 2001-4096). Intermediate segment ports 752(2,1) and 752(2,2) receive this EPA and store information identifying the sending (and/or destination) endpoint as well as the identified range of VLANs. When a segment protocol module within network device 110(2) determines that segment port 752(2,1) is coupled to endpoint 752(1,1), network device 110(2) causes segment port 752(1,2) to block the same range of VLANs. Similarly, when network device 110(2) detects that segment port 752(2,2) is coupled to endpoint 752(1,2), network device 110(2) causes segment port 752(2,2) to block the same range of VLANs as endpoint 752(1,2), which include all VLANs other than those identified in the EPA sent by segment port 752(1,1).

It is noted that other techniques for identifying the VLANs blocked by each endpoint segment port can be used, instead of and/or in addition to the bitmaps and EPAs described above. In general, the segment protocol can use one or more exchanged segment protocol messages to detect whether a segment port is coupled to a blocked segment port and cause that segment port to block the same range of VLANs as the blocked segment port.

While FIG. 8A shows a scenario in which only two network devices 110(1) and 110(2) are part of the network segment, FIG. 8B shows a scenario in which the network segment includes segment ports in three different network devices 110(1), 110(2), and 110(3). As shown, network segment 100(2) includes segment ports 752(1,1) and 752(1,2) in network device 110(1), segment port 752(2,1) in network device 110(2), and segment port 752(3,1) in network device 110(3). The segment endpoints are segment ports 752(3,1) and 752(2,1).

In this example, complementary ranges of VLANs will be blocked by the segment endpoints. For example, segment port 752(3,1) can block VLANs 1-2000 and segment port 752(2,1) can block VLANs 2001-4096. As EPA and/or BPA messages effecting the blocking and unblocking of particular segment ports for particular VLANs are exchanged, segment ports 752(1,1) and 752(1,2), which are coupled to the endpoint segment ports, will determine (1) that those segment ports are coupled to endpoint segment ports and (2) the range of VLANs being blocked by the endpoint segment port to which each is coupled. For example segment port 752(1,1) can store information (e.g., obtained from an EPA message) indicating that segment port 752(1,1) is coupled to endpoint segment port 752(3,1) and should block VLANs 1-2000 (the same VLANs blocked by endpoint segment port 752(3,1). Similarly, segment port 752(1,2) can store information indicating that segment port 752(1,2) is coupled to endpoint segment port 752(2,1) and should block VLANs 2001-4096 (the same VLANs blocked by endpoint segment port 752(2,1).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a segment protocol message from a first segment port within a network segment, wherein
the network segment comprises a plurality of network devices,
the segment protocol message is received on a second segment port within the network segment, and
the segment protocol message comprises
a first port key, and
a first port priority;
in response to receipt of the segment protocol message,
comparing a second port priority of the second segment port with the first port priority, and
comparing a second port key of the second segment port with the first port key;
in response to an outcome of the comparing the second port priority,
determining whether to send a responsive segment protocol message to the first segment port; and
in response to an outcome of the comparing the second port key,
determining whether to operate the second segment port in a blocked state, wherein
operation of the second segment port in the blocked state prevents data plane connectivity via the network segment but does not prevent control plane connectivity, and
the segment protocol message is a control plane message.

2. The method of claim 1, further comprising:
receiving a topology change indication, wherein
the topology change indication identifies a topology change external to the network segment; and
continuing to operate the second segment port in the blocked state, subsequent to receipt of the topology change indication.

3. The method of claim 1, further comprising:
receiving a topology change indication, wherein
the topology change indication identifies a topology change within the network segment, and
the topology change prevents data plane connectivity between endpoints of the network segment; and
operating the second segment port in a non-blocked state, in response to receipt of the topology change indication.

4. The method of claim 3, wherein the topology change indication is a data plane message.

5. The method of claim 3, wherein
the topology change indication comprises information indicating that a failed segment port has a higher port priority than the second port priority of the second segment port.

6. The method of claim 1, further comprising:
in response to detection of a failure affecting the second segment port,
operating the second segment port in the blocked state, and
sending a topology change notification from the second segment port toward each endpoint segment port of the network segment, wherein
the topology change notification comprises information informing other segment ports within the network segment to operate in the non-blocked state.

7. The method of claim 6, further comprising:
sending a second topology change notification from the second segment port, in response to the detection of the failure, wherein
the topology change notification is a control plane message, and
the second topology change notification is a data plane message.

8. The method of claim 6, further comprising:
converting the topology change notification into a topology change message; and
conveying the topology change message to a network device external to the network segment.

9. The method of claim 1, wherein the operating the second segment port in the blocked state comprises preventing data plane connectivity via the network segment with respect to fewer than all of a plurality of virtual local area networks (VLANs).

10. The method of claim 9, further comprising:
operating the second segment port in the blocked state in response to receiving a message identifying the fewer than all of the plurality of VLANs, wherein
the message is received from an endpoint segment port.

11. A network device comprising:
a first segment port configured to receive a segment protocol message from a second segment port within a network segment, wherein
the network segment comprises a plurality of network devices,
the first segment port is configured to drop data traffic being conveyed via the network segment if in a blocked state, and
the segment protocol message comprises
a port key, and
a port priority; and
a segment protocol module coupled to the first segment port, wherein the segment protocol module is configured to
compare a first port priority of the first segment port with the port priority, in response to receipt of the segment protocol message,
compare a first port key of the first segment port with the port key, in response to receipt of the segment protocol message,
determine whether to send a responsive segment protocol message to the second segment port, in response to an outcome of a comparison of the first port priority with the port priority, and determine whether to operate the first segment port in the blocked state, in response to an outcome of a comparison of the first port key with the port key, wherein
operation of the first segment port in the blocked state prevents data plane connectivity via the network segment, but does not prevent control plane connectivity, and
the segment protocol message is a control plane message.

12. The network device of claim 11, wherein
the first segment port is configured to receive a topology change indication, wherein
the topology change indication identifies a topology change external to the network segment, and
the segment protocol module is configured to continue to operate the first segment port in the blocked state, subsequent to receipt of the topology change indication.

13. The network device of claim 11, wherein
the first segment port is configured to receive a topology change indication, wherein
the topology change indication identifies a topology change within the network segment, and
the topology change prevents data plane connectivity between endpoints of the network segment, and
the segment protocol module is configured to operate the second segment port in a non-blocked state, in response to receipt of the topology change indication.

14. The network device of claim 13, wherein
the topology change indication is a data plane message, and
the first segment port is configured to generate an interrupt to the segment protocol module in response to receiving the topology change indication.

15. The network device of claim 13, wherein
the topology change indication comprises information indicating that a failed segment port has a higher port priority than the first segment port.

16. The network device of claim 11, wherein
in response to detection of a failure affecting the first segment port, the segment protocol module is configured to
operate the first segment port in the blocked state, and
send a topology change notification from the first segment port toward each endpoint segment port of the network segment, wherein
the topology change notification comprises information informing other segment ports within the network segment to operate in the non-blocked state.

17. The network device of claim 16, wherein
the segment protocol module is configured to send a second topology change notification from the first segment port, in response to the detection of the failure, wherein
the topology change notification is a control plane message, and
the second topology change notification is a data plane message.

18. The network device of claim 11, wherein the first segment port is configured to drop data traffic being conveyed via the network segment within fewer than all of a plurality of VLANs if in a blocked state.

19. A system comprising:
means for receiving a segment protocol message from a first segment port within
a network segment, wherein
the network segment comprises a plurality of network devices,
the segment protocol message is received on a second segment port within the network segment, and
the segment protocol message comprises
a first port key, and
a first port priority;
means for comparing a second port priority of the second segment port with the first port priority, in response to receipt of the segment protocol message;
means for comparing a second port key of the second segment port with the first port key, in response to receipt of the segment protocol message;
means for determining whether to send a responsive segment protocol message to the first segment port, in response to an outcome of the means for comparing the second port priority; and
means for determining whether to operate the second segment port in a blocked state, in response to an outcome of the means for comparing the second port key, wherein
operation of the second segment port in the blocked state prevents data plane connectivity via the network segment but does not prevent control plane connectivity, and
the segment protocol message is a control plane message.

20. The system of claim 19, further comprising:
means for receiving a topology change indication, wherein
the topology change indication identifies a topology change external to the network segment, and
the means for operating the second segment port in the blocked state continue to operate the second segment port in the blocked state, subsequent to receipt of the topology change indication.

21. The system of claim 19, further comprising:
means for receiving a topology change indication, wherein
the topology change indication identifies a topology change within the network segment, and
the topology change prevents data plane connectivity between endpoints of the network segment; and
means for operating the second segment port in a non-blocked state, in response to receipt of the topology change indication.

22. The method of claim 1, wherein the second segment port is configured to send a copy of the segment protocol message toward at least one endpoint segment port.

23. The method of claim 1, further comprising:
sending the responsive segment protocol message to the first segment port, wherein
the responsive segment protocol message comprises information informing the first segment port to operate in a non-blocked state, and
the responsive segment protocol message is another control plane message.

24. The method of claim 22, wherein the information informing the first segment port to operate in the non-blocked state comprises the first port key and the second port priority.

25. The method of claim 22, wherein
the second port priority is higher than the first port priority.

26. The method of claim 6, further comprising:
subsequent to the detection of the failure,
detecting repair of the failure, and
exchanging segment protocol messages with the other segment ports within the network segment, in response to detecting the repair.

27. The method of claim 1, further comprising:
operating the second segment port in a non-blocked state, wherein
the second port key matches the first port key.

* * * * *